(12) United States Patent
Jamin et al.

(10) Patent No.: US 11,943,651 B2
(45) Date of Patent: Mar. 26, 2024

(54) FAULT TOLERANT TRANSMISSION FOR A WIRELESS LINK

(71) Applicant: Cambium Networks Ltd, Ashburton (GB)

(72) Inventors: Antony Jamin, Ashburton (GB); Mark Thomas, Ashburton (GB); Gregor Dean, Ashburton (GB)

(73) Assignee: Cambium Networks Ltd, Ashburton (GB)

( * ) Notice: Subject to any disclaimer, the term of this patent is extended or adjusted under 35 U.S.C. 154(b) by 0 days.

(21) Appl. No.: 15/931,318

(22) Filed: May 13, 2020

(65) Prior Publication Data

US 2020/0275301 A1   Aug. 27, 2020

Related U.S. Application Data

(63) Continuation of application No. PCT/GB2018/053293, filed on Nov. 14, 2018.

(30) Foreign Application Priority Data

Nov. 14, 2017  (GB) .................................... 1718819

(51) Int. Cl.
*H04W 28/02*   (2009.01)
*H04L 41/0654* (2022.01)
(Continued)

(52) U.S. Cl.
CPC ..... *H04W 28/0247* (2013.01); *H04L 41/0654* (2013.01); *H04W 24/04* (2013.01);
(Continued)

(58) Field of Classification Search
None
See application file for complete search history.

(56) References Cited

U.S. PATENT DOCUMENTS 6,687,217 B1   2/2004  Chow
9,001,767 B1   4/2015  Gatewood
(Continued)

FOREIGN PATENT DOCUMENTS

EP   0861527 B1   6/2009
EP   3651494      5/2020
(Continued)

OTHER PUBLICATIONS

International Search Report & Written Opinion issued in PCT/G82018/053293 dated Mar. 28, 2019 (46 pages).
(Continued)

*Primary Examiner* — Andre Tacdiran
(74) *Attorney, Agent, or Firm* — Crowell & Moring LLP

(57) ABSTRACT

Data is transmitted from a first wireless station comprising first and second transmitters to a second wireless station comprising first and second receivers. In the absence of radio link failure detection, first data is transmitted via a first radio link from the first transmitter to the first receiver using a first subset of first radio resource blocks and transmitting second data via a second radio link from the second transmitter to the second receiver using second subset of the first radio resource blocks. The first and second radio links are monitored for a failure. If first radio link failure is detected, the second radio link is operated using a combination of the first and second subsets of the first radio resource blocks. If second radio link failure is detected, the first radio link is operated using a combination of the first and second subsets of the first radio resource blocks.

20 Claims, 14 Drawing Sheets

(51) Int. Cl.
  *H04W 24/04* (2009.01)
  *H04W 36/22* (2009.01)
  *H04W 72/0446* (2023.01)
  *H04W 76/15* (2018.01)
  *H04W 76/25* (2018.01)
  *H04W 88/06* (2009.01)

(52) U.S. Cl.
  CPC ....... *H04W 36/22* (2013.01); *H04W 72/0446* (2013.01); *H04W 76/15* (2018.02); *H04W 76/25* (2018.02); *H04W 88/06* (2013.01)

(56) References Cited

U.S. PATENT DOCUMENTS

| | | | |
|---|---|---|---|
| 9,088,988 B1 | 7/2015 | Park et al. | |
| 2005/0186962 A1* | 8/2005 | Yoneyama | H04W 24/10 455/435.2 |
| 2005/0250506 A1* | 11/2005 | Beale | H04L 5/0037 370/329 |
| 2007/0032241 A1* | 2/2007 | Busch | H04B 7/022 455/450 |
| 2008/0130726 A1 | 6/2008 | Sofer | |
| 2009/0046793 A1* | 2/2009 | Love | H04L 1/1607 375/260 |
| 2009/0186585 A1 | 7/2009 | Ahrony et al. | |
| 2010/0098045 A1* | 4/2010 | Miyazaki | H04L 1/1825 370/342 |
| 2011/0103341 A1* | 5/2011 | Ko | H04B 7/0669 370/329 |
| 2011/0293025 A1* | 12/2011 | Mudulodu | H04L 5/006 375/260 |
| 2012/0236774 A1* | 9/2012 | Guey | H04W 28/16 370/312 |
| 2012/0307718 A1* | 12/2012 | Nakasato | H04W 56/0045 370/315 |
| 2013/0005375 A1* | 1/2013 | Chen | H04W 72/541 455/509 |
| 2013/0016616 A1* | 1/2013 | Coldrey | H04B 7/0697 370/242 |
| 2013/0149967 A1 | 6/2013 | Ma | |
| 2013/0322348 A1* | 12/2013 | Julian | H04N 21/4384 370/329 |
| 2014/0080498 A1* | 3/2014 | Kulkarni | H04W 72/06 455/452.1 |
| 2014/0092828 A1* | 4/2014 | Sirotkin | H04J 11/0086 370/329 |
| 2014/0160939 A1 | 6/2014 | Arad et al. | |
| 2015/0023227 A1* | 1/2015 | Khoo | H04B 7/2656 370/280 |
| 2015/0236951 A1 | 8/2015 | Nguyen | |
| 2015/0341130 A1* | 11/2015 | Zhou | H04L 43/067 370/336 |
| 2016/0105266 A1* | 4/2016 | Heo | H04L 1/0038 370/329 |
| 2016/0128064 A1* | 5/2016 | Su | H04W 52/267 370/329 |
| 2017/0006580 A1* | 1/2017 | Patil | H04W 74/08 |
| 2017/0171903 A1* | 6/2017 | Kubota | H04W 48/16 |
| 2017/0295554 A1* | 10/2017 | Lee | H04W 56/0025 |
| 2018/0092002 A1* | 3/2018 | Manolakos | H04W 28/20 |
| 2018/0167847 A1* | 6/2018 | Negm | H04W 28/02 |
| 2019/0053217 A1* | 2/2019 | Al-Imari | H04W 76/28 |
| 2019/0097707 A1* | 3/2019 | Cox | H04L 5/14 |
| 2019/0173652 A1* | 6/2019 | Fehrenbach | H04L 5/0073 |
| 2020/0359345 A1* | 11/2020 | Liu | H04W 72/005 |

FOREIGN PATENT DOCUMENTS

| | | |
|---|---|---|
| GB | 2568315 A | 11/2017 |
| WO | WO 2019/019008 A1 | 1/2019 |
| WO | WO 2019/097221 A1 | 5/2019 |

OTHER PUBLICATIONS

Search Report issued in GB1718819.4, dated May 14, 2018 (2 pages).
European Patent Office Communication issued in corresponding Application No. 18 829 902.8-1206 dated Oct. 7, 2022 (8 pages).

\* cited by examiner

S 12.1 — de-multiplex a data stream into a first data stream for transmission as a first modulated signal from a primary master radio at the first wireless station and into a second data stream for transmission as a second modulated signal from a secondary master radio at the first wireless station S 12.2 — transmit, in a first timeslot, the first modulated signal at a first carrier frequency from the primary master radio at the first wireless station to a primary slave radio at the second wireless station, and transmit, in a second timeslot, the second modulated signal at the first carrier frequency from the secondary master radio at the first wireless station to a secondary slave radio at the second wireless station, the first timeslot being arranged not to overlap the second timeslot S 12.3 — aggregate a data stream received by the primary slave radio with a data stream received by the secondary slave radio

Figure 12

FAULT TOLERANT TRANSMISSION FOR A WIRELESS LINK

CROSS-REFERENCE TO RELATED APPLICATIONS

This application is a continuation of International Patent Application No. PCT/GB2018/053293, filed Nov. 14, 2018, designating the United States and published in English as WO 2019/097221 A1 on May 23, 2019, which claimed priority from GB Application No. 1718819.4, filed on Nov. 14, 2017, the entirety of which are each hereby fully incorporated by reference herein.

TECHNICAL FIELD

The present invention relates generally to fault tolerant transmission for a wireless link, and more specifically, but not exclusively, to a method of efficient allocation of radio resource for primary and secondary radio links providing redundancy to enable operation to continue in the event of a fault in one of the radio links.

BACKGROUND

It may be desired to provide fault tolerant transmission for data transported across a wireless link. The wireless link may, for example, take the form of a microwave link, which may have a range of several kilometers between antenna towers, as a point to point or point to multipoint broadband link between two wireless stations. The wireless link may connect a master wireless station to a slave wireless station controlled by the master wireless station. The wireless stations on the link transmit and receive according to a predetermined time division duplex and time division multiplex sequence, in which the timing of the transmissions from each wireless station is determined with respect to a common time reference. Typically transmissions occur within designated timeslots within a predetermined frame sequence.

One known approach to providing fault tolerant transmission is to multiplex data between two radio links and to aggregate the data on reception. If a fault is detected on one radio link, the data is directed to the good radio link. This makes efficient use of the equipment in the absence of a fault condition, but provides reduced capacity in the fault condition. Another known approach to providing fault tolerant transmission is to provide a so-called "hot standby" system. Two transmitters and two receivers are provided, typically arranged to use the same frequency and polarisation. In the absence of a fault condition, one transmitter is active, transmitting data, and the other is muted, not transmitting, and both receivers are active and receiving a common signal from the active transmitter. Data is only taken from one of the receivers. In the event of a failure of the link, if the receiver has failed, the other receiver may be used, or if the transmitter has failed, the other transmitter may be used. This maintains capacity in a fault condition, but makes inefficient use of the equipment and may involve a delay in setting up a link and an interruption of data on handover to the other transmitter.

Aspects of the invention mitigate limitations of prior art systems.

SUMMARY

In accordance with a first aspect of the invention there is provided a method of transmission of data from a first wireless station comprising a first transmitter and a second transmitter to a second wireless station comprising a first receiver and a second receiver, comprising:

in the absence of detection of a failure of a radio link, transmitting first data via a first radio link from the first transmitter to the first receiver using a first subset of first radio resource blocks and transmitting second data via a second radio link from the second transmitter to the second receiver using second subset of the first radio resource blocks;

monitoring the first radio link and the second radio link for a failure of the first radio link or the second radio link; and if a failure of the first radio link is detected, operating the second radio link from the second transmitter to the second receiver using a combination of the first and second subsets of the first radio resource blocks, and if a failure of the second radio link is detected, operating the first radio link from the first transmitter to the first receiver using a combination of the first and second subsets of the first radio resource blocks.

This allows data capacity to be maintained in the fault condition by re-allocating the radio resource of the failed link to the good link, and maintains operation of both links in the absence of failure to reduce start-up time in the event of a failure and to provide assurance that the system will perform correctly in the event of failure of one link.

In an embodiment of the invention, the first subset of the first radio resource blocks comprise a first timeslot occupying a first frequency channel and the second subset of the first radio resource blocks comprise a second timeslot occupying the first frequency channel.

This allows an increase in capacity of the working radio link when a fault is detected in the other radio link fault by increasing the length of the timeslot used by the working radio link within the time allocated to the two radio links.

In an embodiment of the invention, the first subset of the first radio resource blocks comprise a first frequency channel in a first timeslot and the second subset of the first radio resource blocks comprise a second frequency channel in the first timeslot.

This allows an increase in capacity of the working radio link when a fault is detected in the other radio link fault by increasing the frequency bandwidth used by the working radio link within the bandwidth allocated to the two radio links.

In an embodiment of the invention, the first radio resource blocks occupy a contiguous allocation in frequency and a contiguous allocation in time within a recurring timeslot.

This allows efficient use of reallocated radio resource in a fault condition by expansion of a timeslot and/or a frequency bandwidth.

In an embodiment of the invention, the first data and second data comprise payload data.

This allows payload data to be used to maintain the synchronisation of both radio links in the absence of a fault condition.

In an embodiment of the invention, the method comprises:

in the absence of detection of a failure of a radio link, de-multiplexing a payload data stream into a first data stream for transmission via the first radio link and into a second data stream for transmission via the second radio link and aggregating data received via the first radio link with data received via the second radio link at the second wireless station, and if a failure of the first radio link is detected, transmitting the payload data stream via the second radio link, and if a failure of the second radio link is detected, transmitting the payload data stream via the first radio link.

This allows payload data to be used to maintain the synchronisation of both radio links in the absence of a fault condition.

In an embodiment of the invention, the first subset of the first radio resource blocks has substantially the same capacity as the second subset of the first radio resource blocks.

This allows a convenient implementation.

In an embodiment of the invention, the first data comprises payload data and the second data comprises control data and does not comprise payload data.

This allows a simple implementation by avoiding the need for data multiplexing and aggregation.

In an embodiment of the invention, the method comprises:

if a failure of the first radio link is detected, switching the payload data stream for transmission via the second radio link and if failure of the second radio link is detected, switching the payload data stream for transmission via the first radio link.

This allows a simple implementation by avoiding the need for data multiplexing and aggregation.

In an embodiment of the invention, the first subset of radio resource blocks has greater capacity than the second subset of radio resource blocks.

This allows the data capacity in the absence of a fault condition to be increased while using data switch as opposed to a multiplexer/demultiplexer.

In an embodiment of the invention, the first subset of radio resource blocks has greater than nine times the capacity of the second subset of radio resource blocks.

This allows an efficient implementation.

In an embodiment of the invention, the first and second subsets of radio resource blocks are radio resource blocks within transmit timeslot of a TDD frame.

This allows an efficient implementation.

In an embodiment of the invention, the first and second wireless stations are part of a wireless network comprising further wireless stations synchronised according to a TDD and TDMA protocol.

This allows there first and second wireless stations to be used within a wireless network having other wireless stations.

In accordance with a second aspect of the invention there is provided a first wireless station comprising a primary master radio and a secondary master radio, the first wireless station being configured for transmission of data from the first wireless station to a second wireless station comprising a primary slave radio and a secondary slave radio, the first wireless station comprising a controller configured to:

in the absence of detection of a failure of a radio link, cause the primary master radio to transmit first data from the primary master radio to the primary slave radio via a first radio link using a first subset of first radio resource blocks and cause the secondary master radio to transmit second data from the secondary master radio to a secondary slave radio via a second radio link using second subset of the first radio resource blocks;

dependent on detection of the failure of the first radio link, causing the secondary master radio to use a combination of the first and second subsets of the first radio resource blocks for the second radio link, and dependent on detection of the failure of the second radio link, causing the secondary master radio to use a combination of the first and second subsets of the first radio resource blocks for the first radio link.

Further features of the invention will be apparent from the following description of preferred embodiments of the invention, which are given by way of example only.

BRIEF DESCRIPTION OF THE DRAWINGS

FIG. 12 is a flow diagram showing a method according to an embodiment of the invention.

DETAILED DESCRIPTION

By way of example, embodiments of the invention will now be described in the context of a point-to-point microwave broadband link operating as a time division duplex system at carrier frequencies typically between 3 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands. Typical applications include backhaul systems and microwave Ethernet bridges, for providing connectivity to small cell and macro cell infrastructure, for leased line replacement, and for providing rapidly deployed video, voice and data services for disaster recovery.

Figure 1A:
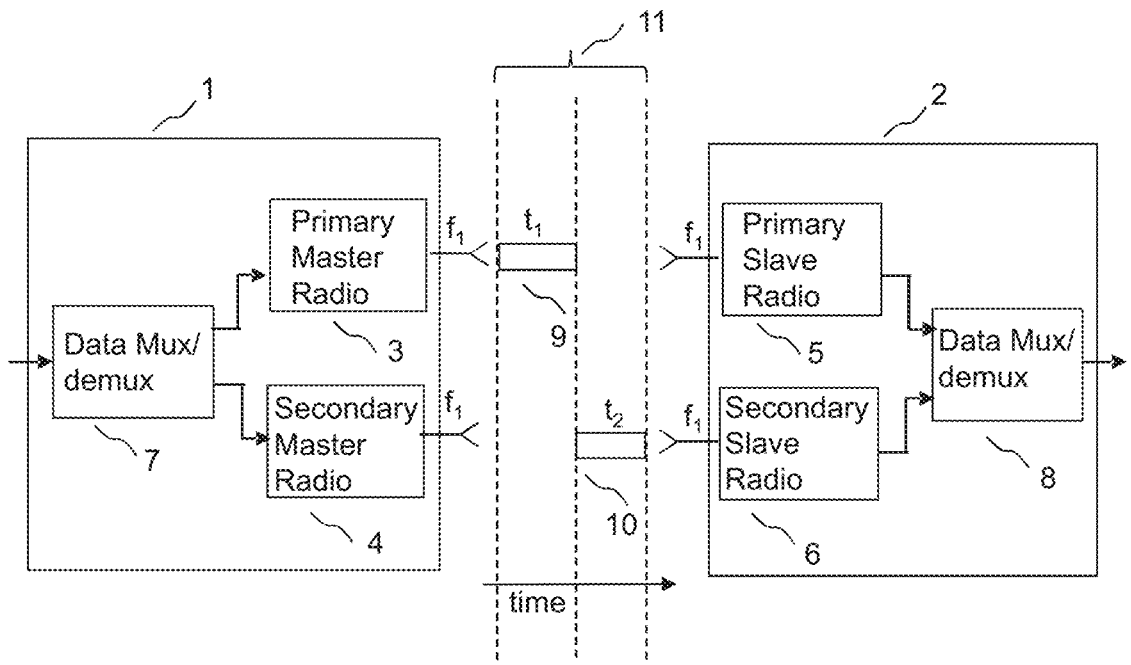
FIG. 1a is a schematic diagram showing transmission of data from a first wireless station to a second wireless station in the absence of a fault condition, the data being multiplexed for transmission over a first radio link in a first timeslot and over a second radio link in a second timeslot.
Figure 1B:
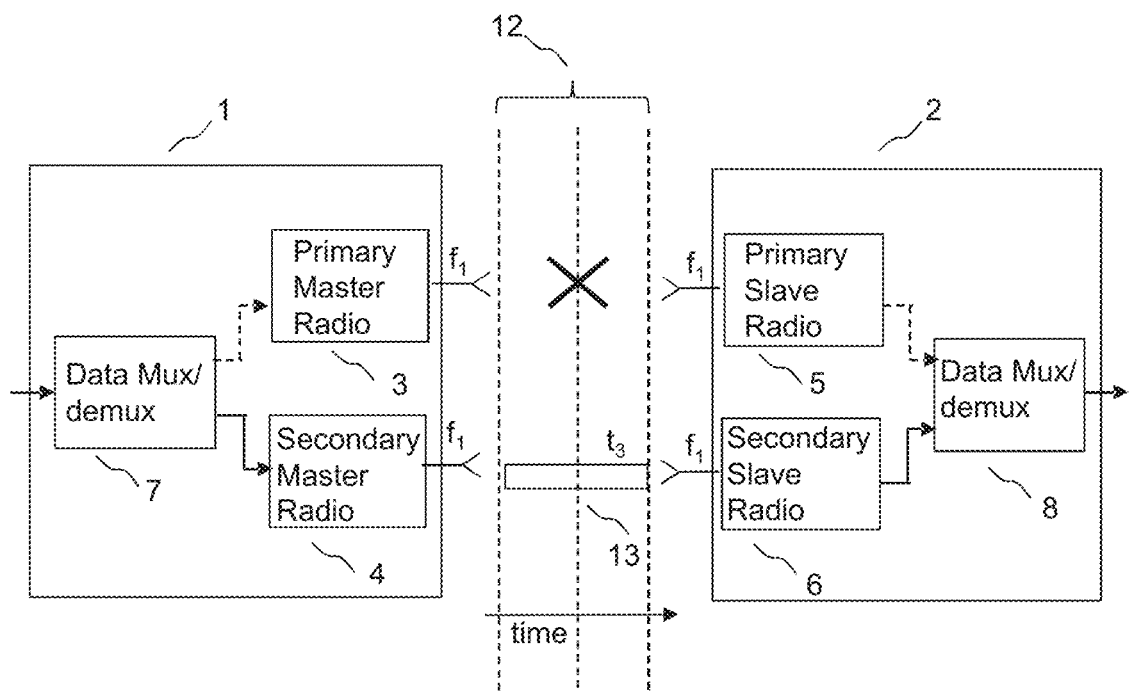
FIG. 1b is a schematic diagram showing the system of FIG. 1a in a fault condition of the first radio link, the data being transmitted over the second radio link in the first and second timeslots.

FIGS. 1a and 1b show an embodiment of the invention. FIG. 1a shows transmission of data from a first wireless station 1 to a second wireless station 2 in the absence of a fault condition. As shown in FIG. 1a, in the absence of detection of a failure of a first radio link, data is transmitted from a first transmitter in a primary master radio 3 at the first wireless station 1 to a first receiver in a primary slave radio 5 at the second wireless station 2, via a first radio link using a first subset of first radio resource blocks, in this case a first timeslot 9, of duration $t_1$. In addition, second data is transmitted from a second transmitter in a secondary master radio 4 at the first wireless station 1 to a second receiver in a secondary slave radio 6 at the second wireless station 2 via a second radio link using a second subset of the first radio resource blocks, in this case a second timeslot 10, of duration $t_2$.

The first radio link and the second radio link are monitored for a failure of the first radio link or the second radio link. The monitoring may be carried out by a control processor, for example at the first wireless station, and may be on the basis of monitoring of synchronisation of the receiver, fed back as signalling data from the second wireless station. A failure of synchronisation may result in the detection of a failure of a link. Alternatively or additionally, detection of a failure of a link may be on the basis of detection of a packet error rate or bit error rate being greater than an acceptable threshold. It may be required that an error or failure condition persists for at least a predetermined period of time, in order for a failure of a link to be detected. Other methods of detection of a failure of a link may be used, such as, for example, monitoring of received signal power level, and detecting a failure if the received signal power level falls below a threshold level for a predetermined period of time.

As shown in FIG. 1b, if a failure of the first radio link is detected, a combination of the first and second subsets of the first radio resource blocks is used for the second radio link, in this case by extending the duration of the timeslot used by the second radio link to a longer timeslot 13 with duration $t_3$, to occupy the time allocated to both the first and second links. This allows data capacity to be maintained in the fault condition, and because both the first and second links are already established and being monitored, this provides assurance that the system will perform correctly in the event of failure of one link, and avoid the need for a start-up time to be allowed for a link to be established. The assurance that the system will perform correctly in the event of failure of one link, and the avoidance of the need for a start-up time, is gained at the potential cost that the selection of links is between only the two alternative established links, being the first link from the first transmitter to the first receiver, and the second link from the second transmitter to the second receiver. The potential cost of this approach is that selection by this method would not allow selection of cross-coupled links between the first transmitter and the second receiver, or between the second transmitter and the first receiver. However, the cross-coupled links could be tried as a fall-back if detection of failure of both the first and second links is detected, but without the advantages of assured performance and lack of set-up time. So, the present method typically provides advantages if a single link fails, but at the cost of potential disadvantages in the event of both links failing.

As shown in FIG. 1a, the first subset of the first radio resource blocks comprise a first timeslot 9 occupying a first frequency channel $f_1$ and the second subset of the first radio resource blocks comprise a second timeslot 10 occupying the same first frequency channel $f_1$. This allows an increase in capacity of the working radio link when a fault is detected in the other radio link by increasing the length of the timeslot used by the working radio link within the time allocated to the two radio links.

In the embodiment shown in FIGS. 1a and 1b, the first data and second data comprise payload data. In the absence of detection of a failure of the first radio link, the input data to the first wireless station 1, which is a payload data stream in this example, is de-multiplexed by the data mux/demux function 7 into a first data stream for transmission via the first radio link and into a second data stream for transmission via the second radio link. On reception at the second wireless station 2, data received at the second wireless station via the first radio link is aggregated in the data mux/demux function 8 with data received via the second radio link. As shown in FIG. 1b, dependent on detection of a failure of the first radio link, the payload data stream is transmitted via the second radio link only, and the data is not multiplexed or aggregated. This allows payload data to be used to maintain the synchronisation of both radio links in the absence of a fault condition, so that there is no need for a delay to allow for the start up of a second link in a fault condition, since both links are already operating.

As shown in FIG. 1a, the first subset of the first radio resource blocks, in this case the first timeslot 9, has substantially the same capacity as the second subset of the first radio resource blocks, in this case the second timeslot 10.

Figure 2A:
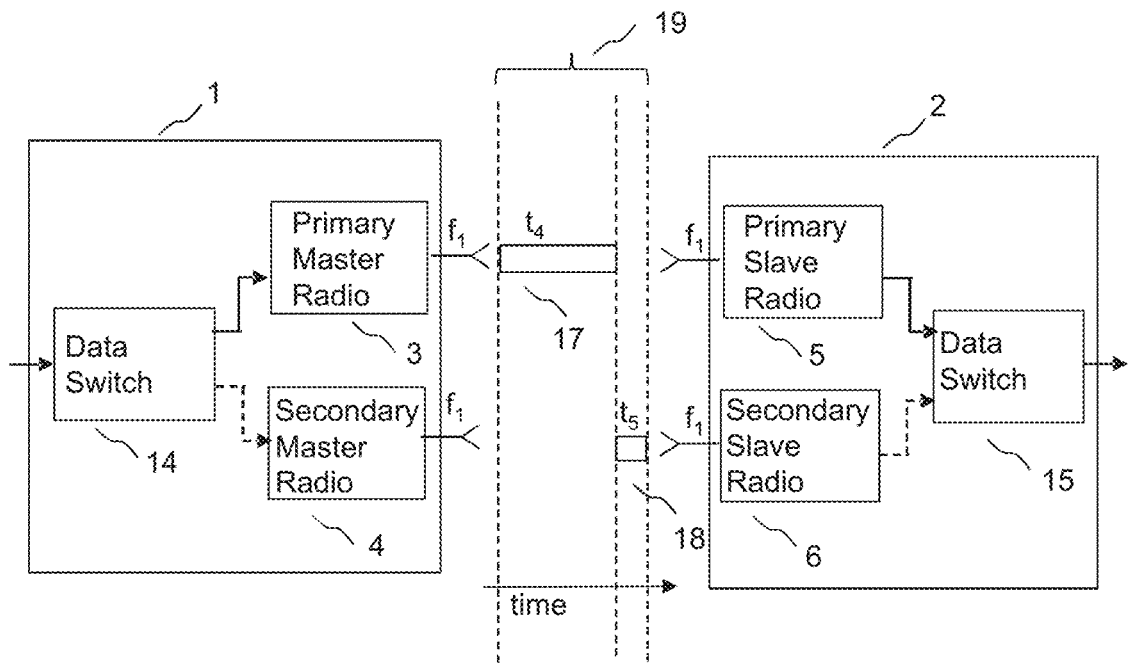
FIG. 2a is a schematic diagram showing transmission of data from a first wireless station to a second wireless station in the absence of a fault condition, the data being switched for transmission over a first radio link in a first, longer, timeslot and additional data, such as control data, being transmitted over a second radio link in a second, shorter, timeslot.
Figure 2B:
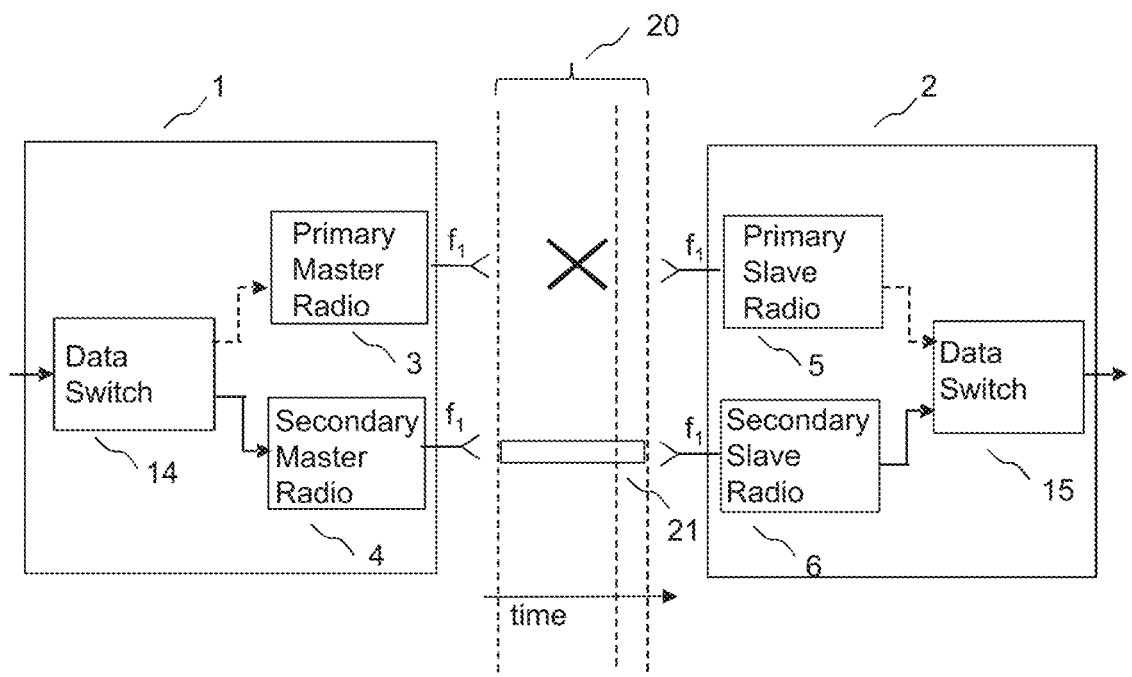
FIG. 2b is a schematic diagram showing the system of FIG. 2a in a fault condition of the first radio link, the data being transmitted over the second radio link in the first and second timeslots.

FIGS. 2a and 2b show an embodiment in which the first data comprises payload data and the second data comprises control data and does not comprise payload data. The second data serves to keep the second data link in synchronisation. As shown in FIG. 2a, in the absence of detection of a failure of the first radio link, a payload data stream is switched for transmission via the first radio link by data switch 14. On reception at the second wireless station 2, a data switch 15 selects data received via the first radio link. As shown in FIG. 2b, dependent on detection of a failure of the first radio link, the payload data stream is switched by data switch 15 for transmission via the second radio link in an extended timeslot 21. On reception at the second wireless station 2, a data switch 15 selects data received via the second radio link. This allows a simple implementation by avoiding the need for data multiplexing and aggregation.

As shown in FIG. 2a, the first subset of radio resource blocks, in this case the first timeslot 17 of duration $t_4$, has greater capacity than the second subset of radio resource blocks, in this case the second timeslot 18 of duration $t_5$, which is shorter than $t_4$. This allows the data capacity in the absence of a fault condition to be increased while using data switch as opposed to a multiplexer/demultiplexer, so that only one of the radio links is used for transmission of payload data. The first subset of radio resource blocks may have greater than nine times the capacity of the second subset of radio resource blocks. The asymmetry increases the payload data capacity in the absence of a fault condition.

Figure 3A:
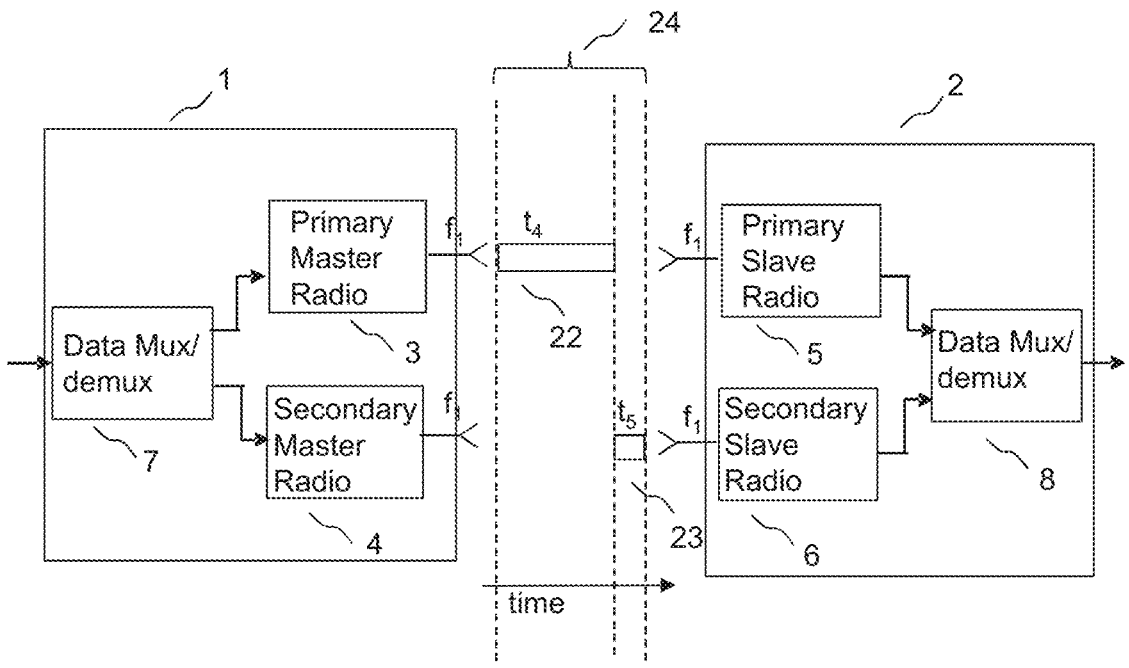
FIG. 3a is a schematic diagram showing transmission of data from a first wireless station to a second wireless station in the absence of a fault condition, the data being multiplexed for transmission over a first radio link in a first, longer, timeslot and over a second radio link in a second, shorter, timeslot.
Figure 3B:
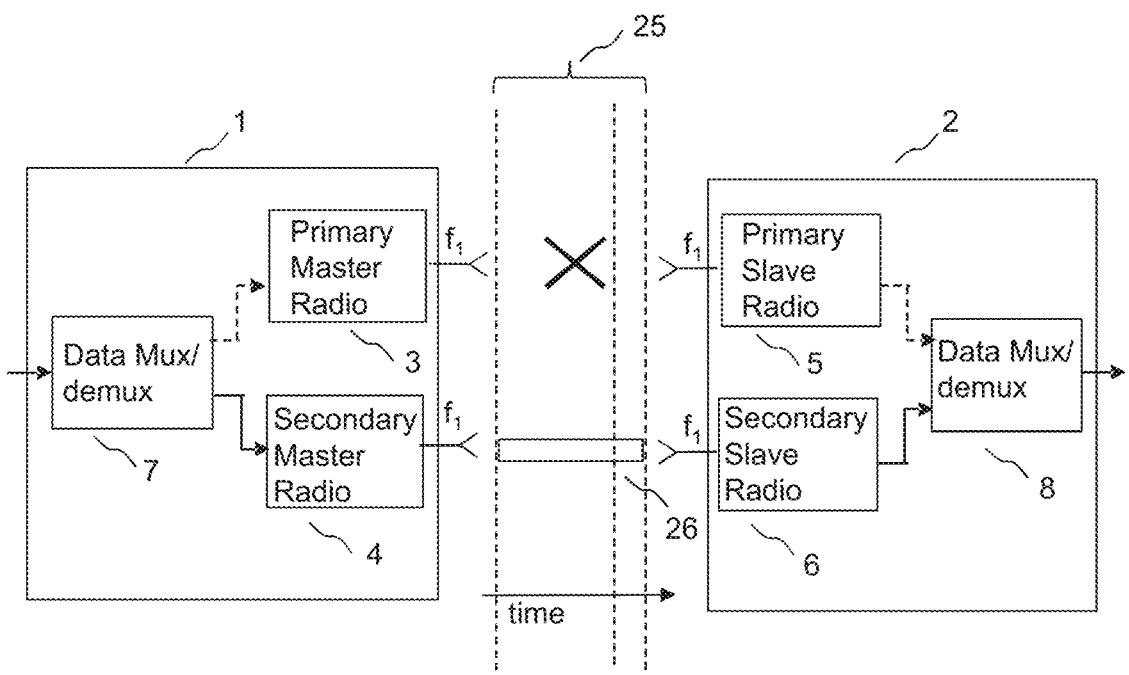
FIG. 3b is a schematic diagram showing the system of FIG. 3a in a fault condition of the first radio link, the data being transmitted over the second radio link in the first and second timeslots.

FIGS. 3a and 3b show a case where payload data is demultiplexed at the first wireless station in the absence of a fault condition between the first and second radio links, in a case where the first timeslot 22 for the first radio link is longer than the second timeslot 23 for the second radio link. This may simplify multiplexing and aggregation for some types of data. On detection of failure of the first radio link, the second timeslot is extended to a longer timeslot 26.

Figure 4A:
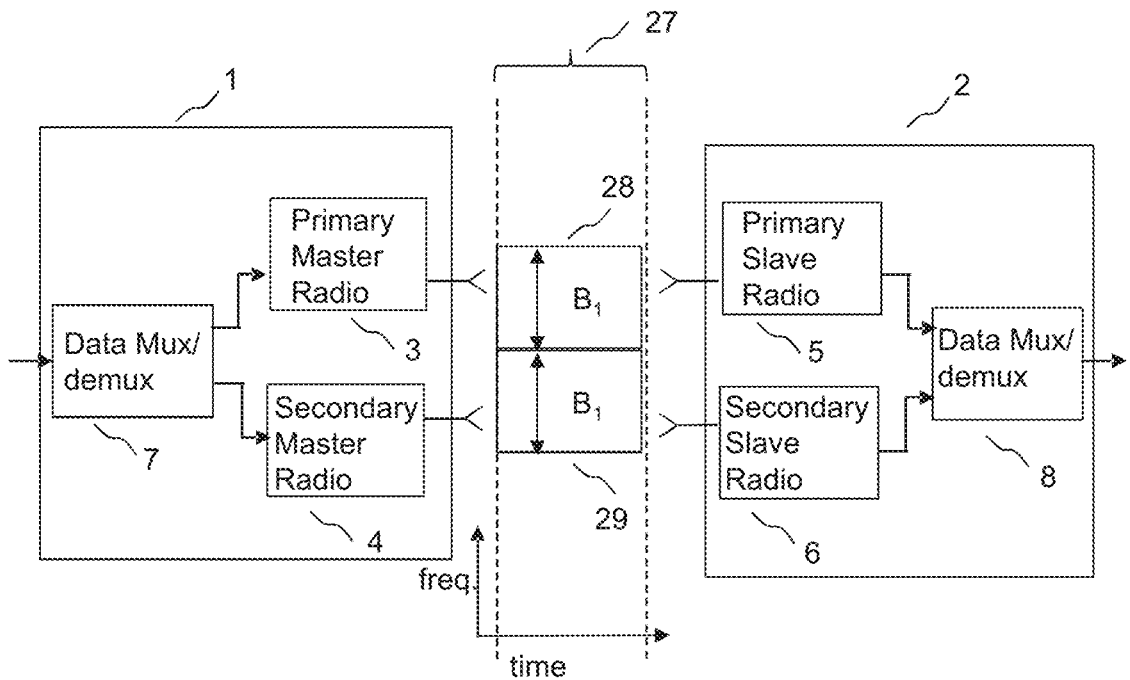
FIG. 4a is a schematic diagram showing transmission of data from a first wireless station to a second wireless station in the absence of a fault condition, the data being multiplexed for transmission over a first radio link in a first frequency channel and over a second radio link in a second frequency channel, the first and second frequency channels being adjacent channels.
Figure 4B:
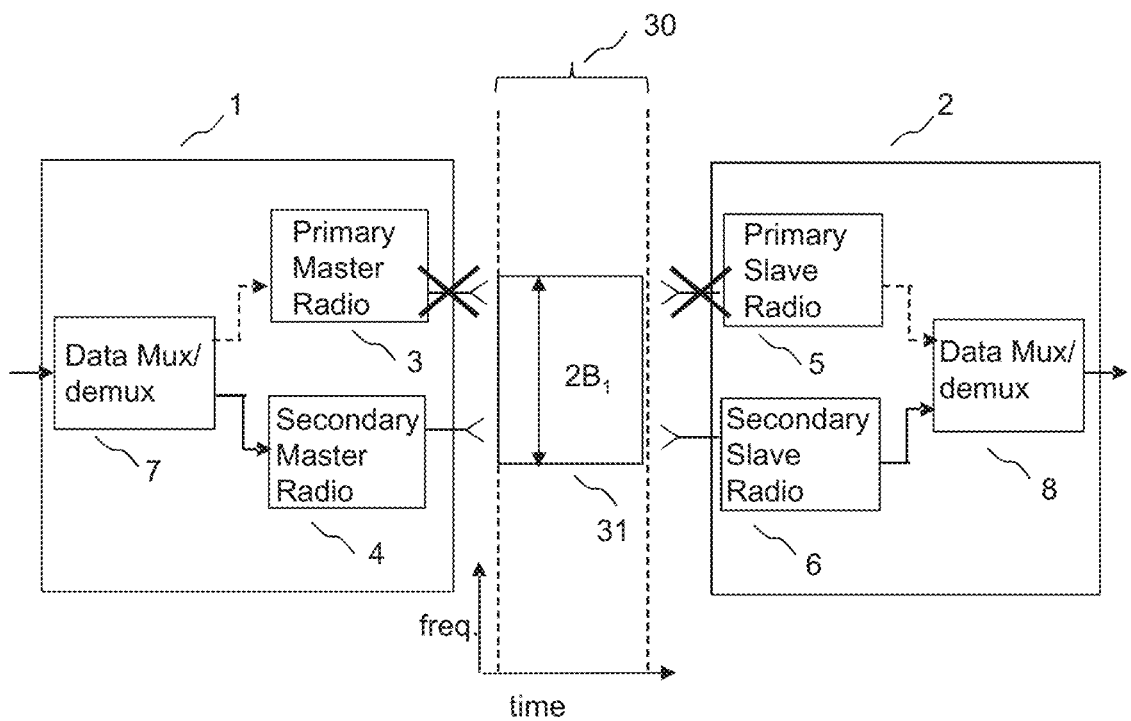
FIG. 4b is a schematic diagram showing the system of FIG. 4a in a fault condition of the first radio link, the data being transmitted over the second radio link in an expanded frequency channel occupying the bandwidth of the first and second frequency channels.

FIGS. 4a and 4b show an embodiment of the invention in which the first subset of the first radio resource blocks 28 comprise a first frequency channel of bandwidth $B_1$ in a first timeslot and the second subset of the first radio resource blocks 29 comprise a second frequency channel in the same first timeslot, also in this example of bandwidth $B_1$, although the bandwidths could differ from each other. As shown in FIG. 4b, when a fault is detected in the first radio link fault, the frequency bandwidth used by the second radio link is increased within the bandwidth allocated to the two radio links, in this case to $2B_1$. As shown in FIGS. 4a and 4b, in an embodiment of the invention, the first radio resource blocks occupy a contiguous allocation in frequency within a timeslot 27, 30. This allows efficient use of reallocated radio resource in a fault condition by expansion of the frequency bandwidth of the second radio link. The expansion of bandwidth may be straightforward to achieve in a radio which has selectable bandwidths. The expansion need not be limited to an expansion by a factor of two; any expansion factor may be used provided that the expanded bandwidth is within the allocation for the first and second links.

FIGS. 1a, 1b, 2a, 2b, 3a, and 3b show that the first radio resource blocks may occupy a contiguous allocation in time, in the form of contiguous timeslots. This does not preclude the inclusion of a guard time between the first and second timeslots.

Figure 5A:
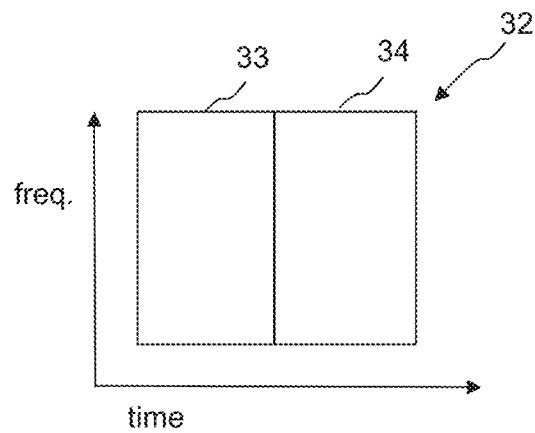
FIG. 5a shows a radio resource block comprising two timeslots.

FIG. 5a shows first radio resource blocks 32 in an embodiment in which the first radio resource blocks 32 comprise two timeslots 33, 34.

Figure 5B:
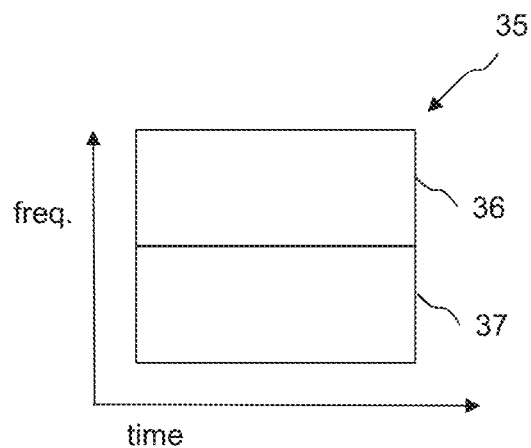
FIG. 5b shows a radio resource block comprising two frequency channels.

FIG. 5b shows first radio resource block 35 in an embodiment in which the first radio resource blocks 35 comprise two frequency channels 36, 37.

Figure 6:
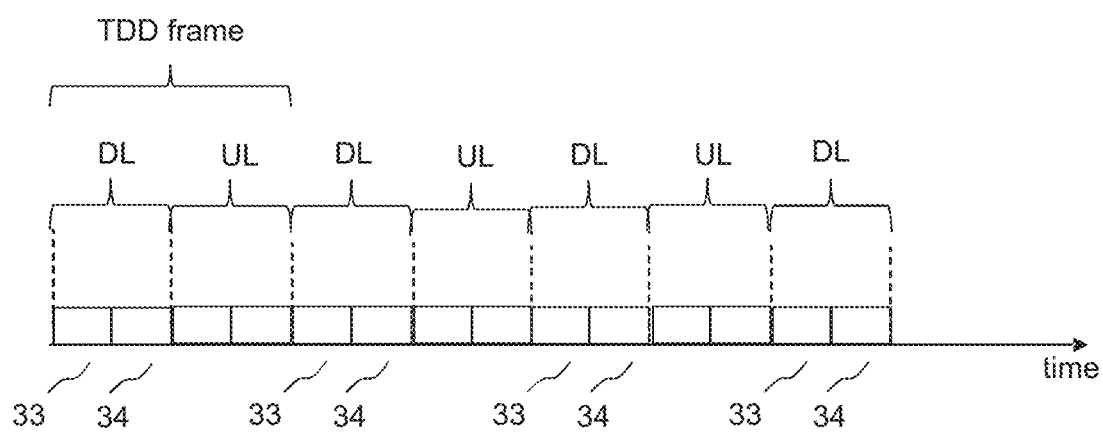
FIG. 6 shows a series of Time Division Duplex frames.

FIG. 6 shows a series of Time Division Duplex (TDD) frames, including downlink frames DL for transmission from the first wireless station 1 to the second wireless station 2, and uplink frames UL for transmission from the second wireless station 2 to the first wireless station 1. As shown in FIG. 6, the first radio resource blocks of FIG. 5a may be transmitted within the recurring downlink timeslots DL, in this examples as the first and second timeslots 33, 34, which are recurring timeslots within the TDD frames. Alternatively, radio resource blocks comprising two frequency channels as shown in FIG. 5b may be transmitted within the downlink timeslots. Also, for uplink operation, radio resource blocks divided in frequency and/or time may also be used for the same reasons as for on the downlink.

Figure 7A:
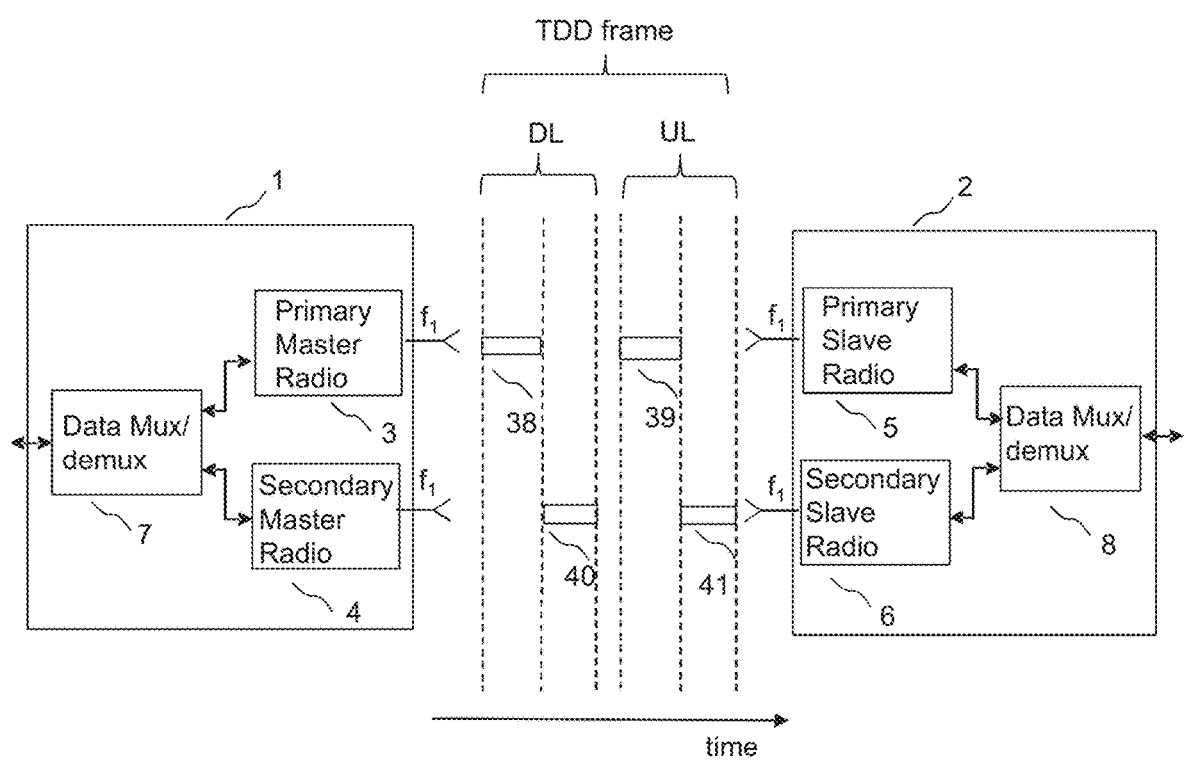
FIG. 7a is a schematic diagram showing transmission of data, in a Time Division Duplex system, between a first wireless station and a second wireless station in the absence of a fault condition, downlink data being multiplexed for transmission from the first wireless station to the second wireless station over a first radio link in a first downlink timeslot and over a second radio link in a second downlink timeslot and uplink data being multiplexed for transmission from the second wireless station to the first wireless station over a first radio link in a first uplink timeslot and over a second radio link in a second uplink timeslot.

FIG. 7a shows bi-directional transmission of data between a first wireless station 1 and a second wireless station 2 in a TDD system in the absence of a fault condition, downlink data being multiplexed for transmission from the first wireless station 1 to the second wireless station 2 over a first radio link in a first downlink timeslot 38, corresponding to timeslot 33 in FIG. 6, and over a second radio link in a second downlink timeslot 40, corresponding to timeslot 34 in FIG. 6, and uplink data being multiplexed for transmission from the second wireless station to the first wireless station over a first radio link in a first uplink timeslot 39 and over a second radio link in a second uplink timeslot 41.

Figure 7B:
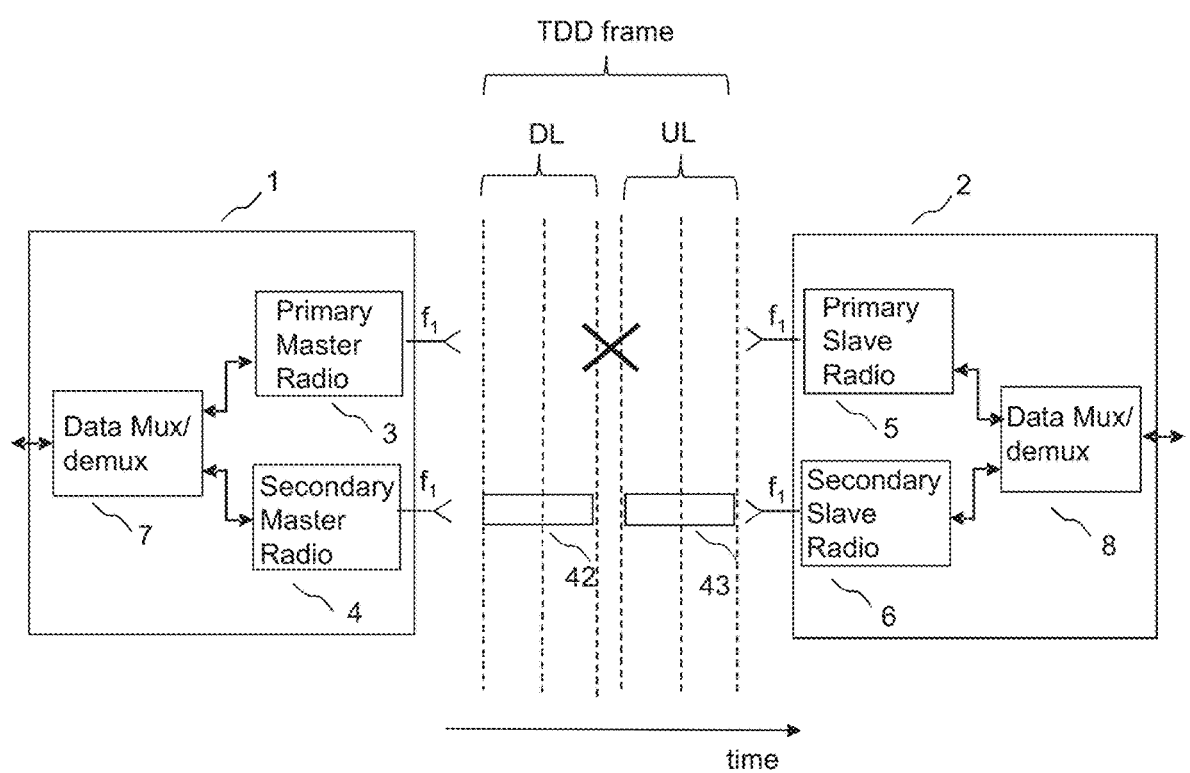
FIG. 7b is a schematic diagram showing the system of FIG. 7a in a fault condition of the first radio link, the data being transmitted over the second radio link in the first and second respective downlink and uplink timeslots.

FIG. 7b shows the system of FIG. 7a in a fault condition of the first radio link, the data being transmitted over the second radio link in extended timeslots 42, 43 occupying the time allocated in the absence of a fault to the first and second respective downlink and uplink timeslots.

In an embodiment of the invention, the first and second wireless stations are part of a wireless network comprising further wireless stations synchronised according to the TDD and TDMA protocol. This allows the first and second wireless stations to be used within a wireless network having other wireless stations.

Figure 8:
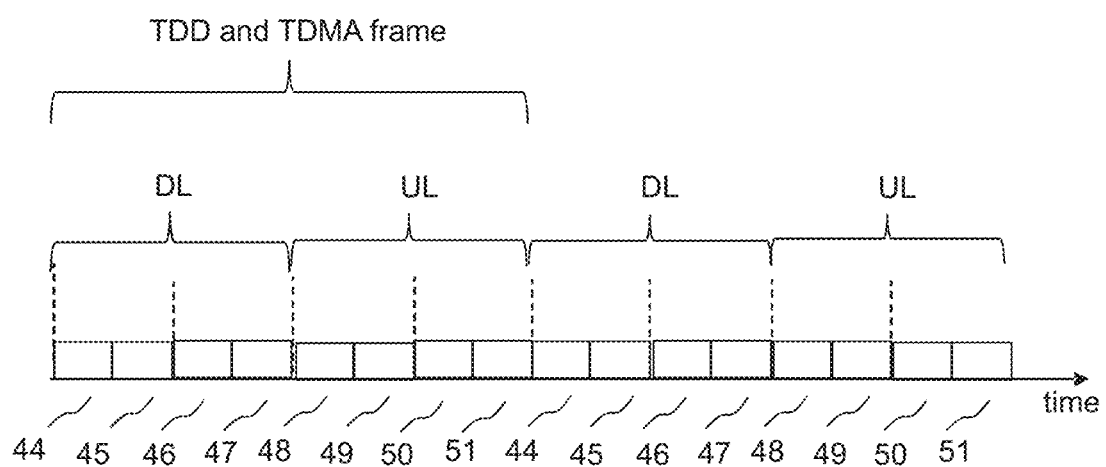
FIG. 8 shows a series of frames according to a Time Division Duplex and Time Division Multiple Access system.

FIG. 8 shows a series of frames according to a Time Division Duplex and Time Division Multiple Access protocol.

Timeslots 44 and 45 are for downlink transmission from the primary and secondary master radio of the first, or master, wireless station to the primary and secondary radios respectively of a second wireless station, which may be a first slave station. Timeslots 46 and 47 are for downlink transmission from the primary and secondary master radio of the first, or master, wireless station to the primary and secondary radios respectively of a third wireless station, which may be a second slave station. Timeslots 48 and 49 are for uplink transmission from the primary and secondary radios respectively of the second wireless station, which may be the first slave station, to the primary and secondary master radio of the first, or master, wireless station. Timeslots 50 and 51 are for uplink transmission from the primary and secondary radios respectively of the third wireless station, which may be the second slave station, to the primary and secondary master radio of the first, or master, wireless station. Although only two slave stations are shown, this is for illustration only and more than two slave stations may be used, each being allocated downlink and uplink timeslots within a TDD/TDMA frame.

Figure 9A:
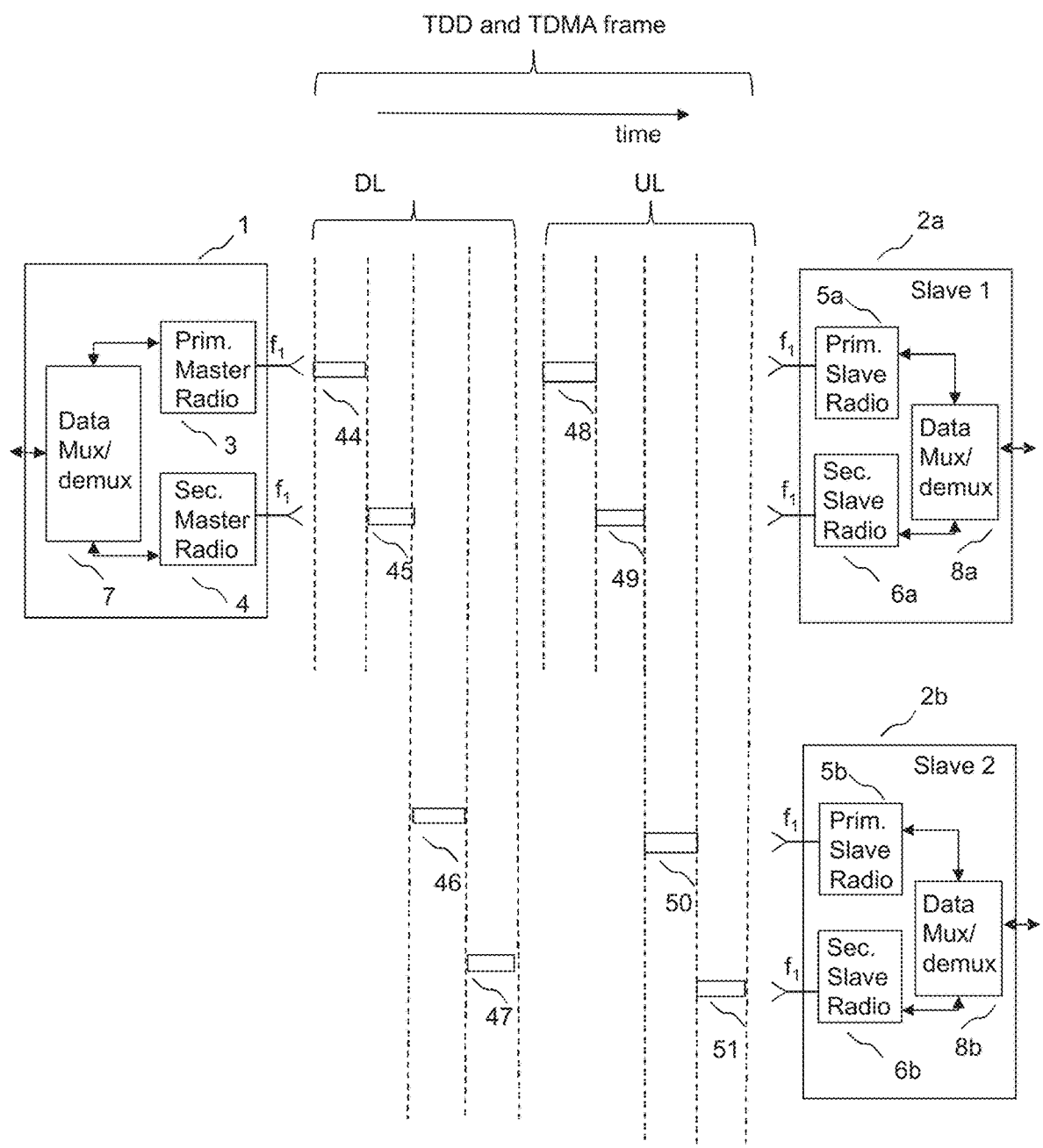
FIG. 9a is a schematic diagram showing transmission of data, in a Time Division Duplex system and Time Division Multiple Access, between a first wireless station and a second and third wireless station in the absence of a fault condition.

FIG. 9a is a schematic diagram showing transmission of data in the timeslots of FIG. 8 in a Time Division Duplex system and Time Division Multiple Access, between a first wireless station 1 and a second 2a and third 2b wireless station in the absence of a fault condition.

Figure 9B:
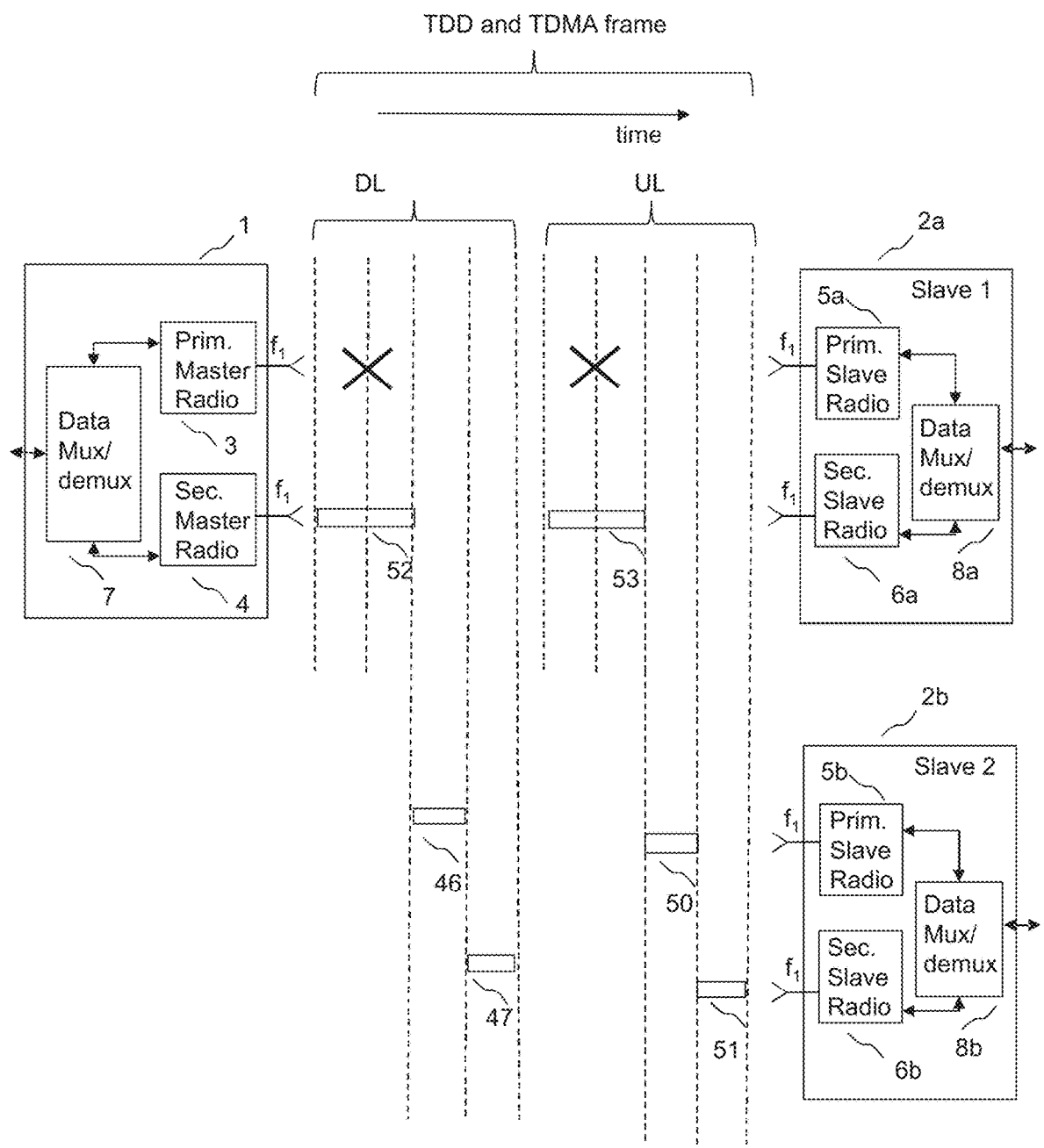
FIG. 9b is a schematic diagram showing the system of FIG. 9a in a fault condition of the first radio link between the first and second wireless stations.

FIG. 9b is a schematic diagram showing the system of FIG. 9a in a fault condition of the first, primary, radio link between the first and second wireless stations. As can be seen, the timeslots 45 and 49 used by the secondary radios of the master station 1 and the first slave station 2a are expanded in time to include the timeslots 44 and 48 previously allocated to the failed first link between the primary radios. The longer timeslots are shown as timeslots 52 and 53. In this example, the timeslots allocated in the link between the master station 1 and the second slave station 2b are unaffected by the failure of the first link. This is because, in this case, the failure is caused by a problem in the first slave station 2a, and does not affect any links to the second slave station 2b. If the failure of the first link is due to a problem in the master station 1, then both the link from the primary master radio 3 to the primary slave radio 5a of the first slave station 2a, and also the link from the primary master radio 3 to the primary slave radio 5b of the second slave station 2b would be affected. In this case, the timeslots 47 and 51 for communication between the secondary master radio 4 and the secondary slave radio 6b would be extended to occupy the time previously allocated to timeslots 46 and 50.

A similar process would occur if a fault is detected in a link between secondary radios, the timeslots used by the secondary radios being allocated to the primary radios. The designation of "primary" and "secondary" radio may be arbitrary.

Figure 10:
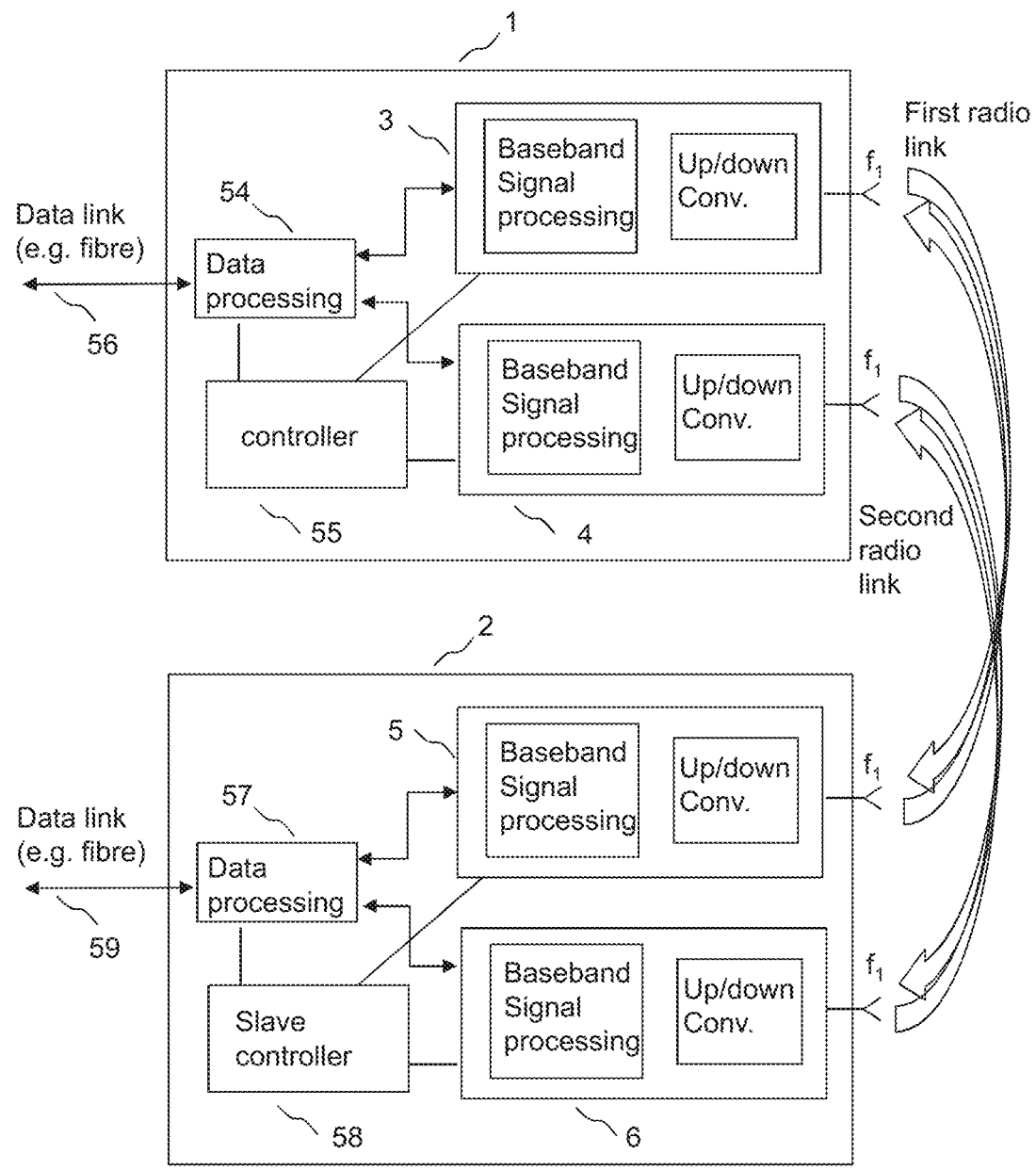
FIG. 10 is a schematic diagram showing the first and second wireless stations.

FIG. 10 shows the first wireless station 1 and the second wireless station 2 in schematic form. A third wireless station, as used as a second slave station in a TDMA scheme, may also have the same block diagram as shown for the first and second wireless stations. Considering the first wireless station 1, a data link 56 is typically connected to the first wireless station 1, typically an optical fibre connection, which may carry, for example, Ethernet traffic. The data stream is processed in a data processing circuit element 54, which may be a multiplexer/demultiplexer circuit element in some embodiments, which splits the data stream into typically two streams before transmission, and aggregates the two data streams on reception, under control of a controller circuit element 55. If a fault condition is detected, the multiplexing and aggregation may be disabled, and the data routed via the second radio link. In another embodiment, the data processing circuit element 54 may be a data switch which routes the data stream via the first or second radio link under control of the controller 55. The data processing circuit element 54 may be implemented using well known techniques including digital signal processing integrated circuits, programmable gate arrays, dedicated hardware.

The controller 55, which may also be referred to as a processor, may comprise program code held in memory configured to cause the controller to perform the method of embodiments of the invention. The processor may comprise one or more digital signal processors, and/or programmable logic arrays.

The primary master radio 3 and the secondary master radio 4 are each connected to and controlled by the controller 55, and each comprises conventional baseband signal processing circuit elements and conventional up-conversion and down-conversion circuit elements, comprising filtering, amplification and mixing components as is conventional in a radio transceiver. Each radio may be connected to a respective antenna as shown, or alternatively the two radios may be connected to the same antenna.

The second wireless station 2 may have an identical construction to the first wireless station 1. The designations of "master radio" and "slave radio" may be arbitrary, and equivalent to "first radio" and "second radio". Typically, the master radio sets the timing for the slave radio, but this may not be the case in all embodiments and the two radios may be equivalent to each other. A radio typically comprises a transmitter and a receiver.

The designations of "primary radio" and "secondary radio" may also be arbitrary, and equivalent to "first radio" and "second radio". In particular, in the embodiments of FIGS. 1a, 1b, 3a, 3b, 4a, 4b, 7a and 7b, the either radio could be the primary radio in terms of the method of operation; the primary radio is the radio whose failure is detected.

The data processing circuit element 57 of the second wireless station 2 is typically the same as the data processing circuit element of the first wireless station 1.

The slave controller 58 of the second wireless station 2 may typically have the same construction as the controller 55 of the first wireless station, and may or may not have the same program code. The second wireless station typically has a data link connection 59 which is similar to that of the first wireless station.

Figure 11:
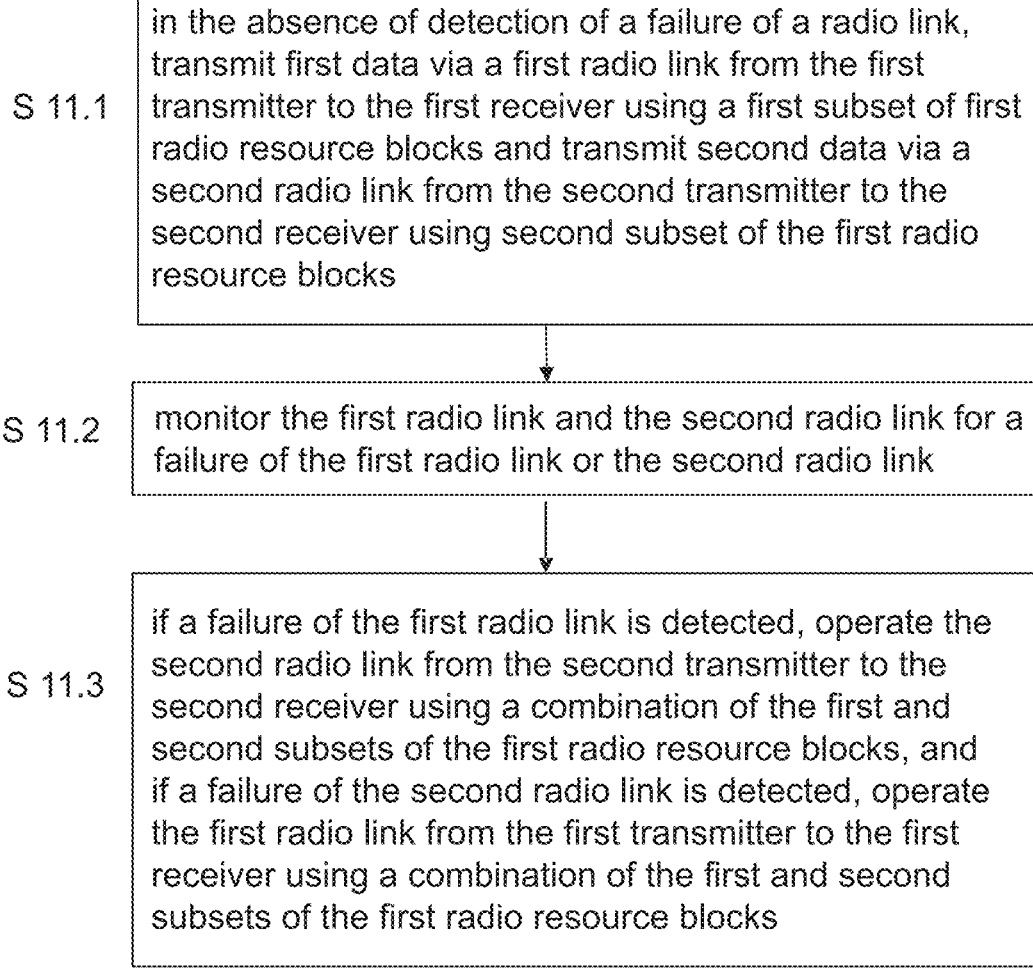
FIG. 11 is a flow diagram showing a method according to an embodiment of the invention.

FIG. 11 is a flow diagram showing a method according to an embodiment of the invention according to steps S11.1, S11.2 and S11.3, and FIG. 12 is a flow diagram showing a method according to an embodiment of the invention according to steps S12.1, S12.2 and S12.3.

So, various embodiments of the invention have been described which comprise either a payload data switch shown in FIGS. 2A and 2B for example, or a payload data multiplexer, as shown in FIGS. 1A and 1B for example. In each case this allows data capacity to be maintained in the fault condition by re-allocating the radio resource of the failed link to the good link, and maintains operation of both links in the absence of failure to reduce start-up time in the event of a failure and to provide assurance that the system will perform correctly in the event of failure of one link. In the case of the use of a payload data switch, one of the links is maintained in the absence of detection of failure by signalling data which typically does not include payload data. In the case of the use of a payload data multiplexer, both of the links are maintained in the absence of detection of failure by payload data. In some circumstances this may allow the data flow to be maintained with less impact on, for example, packet delay than may be the case with the data switch, but at the cost of the higher complexity of the multiplexer.

Embodiments using a data switch may be termed a 1+1 solution. This uses the data switch to provide only one link with active payload data while the other link is inactive with regard to payload data, being maintained by signalling data. Preferably the link which is inactive with regard to payload data is configured to consume a small proportion, for example 10%, of the total time or frequency resources. Bridged payload traffic is typically carried only by the active link. On failure of one link, say the primary link, the remaining link, in this case the secondary link, becomes active in terms of payload data and expands to use all of the resources.

Embodiments using a multiplexer may be termed a 2+0 solution. This uses the multiplexer to provide two links carrying payload data in the absence of a fault, sharing the time or frequency resources. Payload traffic is de-multiplexed and multiplexed so that both links contribute to the overall capacity. On failure of one link, traffic is routed over the remaining link, and the remaining link expands to use all of the resources.

The 1+1 solution is typically simpler in implementation, not requiring the potentially complex multiplexing function. The capacity of the 1+1 solution may increase following failure. The 2+0 solution typically provides slightly higher capacity in normal operation as all the resource blocks are used to transport data.

The 1+1 solution monitors the operation of the equipment which is inactive with regard to payload data and provides assurance that it is available to take over in the event of failure. Conventional systems do not provide complete assurance that the inactive radio will operate correctly after a protection switchover. By maintaining and monitoring two links, embodiments of the invention provide this assurance. However, this may be at the cost of typically not allowing for links to be set up using the transmitter of one link and the receiver of the other link, as may be the case in a conventional hot standby system.

The 1+1 solution allows the inactive link to be established in advance, so that the protection switchover involves only expansion of time or frequency dimensions. This permits the use of air interface methods that inherently take time to establish a link without an excessive downtime on failure of the active link, such as OFDM (Orthogonal Frequency Division Multiplexing). Such air interface methods may be particularly suited to non-ideal wireless paths, for example non-line of sight.

The 2+0 solution maintains overall capacity on link failure, where conventional systems may typically drop to 50% capacity.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of transmission of transmission data from a first wireless station comprising first transmitter and a second transmitter to a second wireless station comprising a first receiver and a second receiver, comprising:
in the absence of detection of a failure of a radio link, de-multiplexing the transmission data between first data and second data at the first wireless station, transmitting the first data via only a first radio link from the first transmitter to the first receiver using a first subset of first radio resource blocks and transmitting the second data via only a second radio link from the second transmitter to the second receiver using a second subset of the first radio resource blocks, and aggregating the first data and the second data at the second wireless station to produce the transmission data, wherein the first subset of radio resource blocks does not include radio resource blocks from the second subset of radio resource blocks, and the second subset of radio resource blocks does not include radio resource blocks from the first subset of radio resource blocks;
monitoring the first radio link and the second radio link for a fault condition comprising a failure of the first radio link or the second radio link; and
dependent on the failure of the first radio link being detected, operating the second radio link from the second transmitter to the second receiver using a combination of the first and second subsets of the first radio resource blocks to transmit the transmission data, maintaining data capacity in the fault condition,
dependent on the failure of the second radio link being detected, operating the first radio link from the first transmitter to the first receiver using a combination of the first and second subsets of the first radio resource blocks to transmit the transmission data, maintaining data capacity in the fault condition.

2. The method of claim 1, wherein the first subset of the first radio resource blocks comprise a first timeslot occupying a first frequency channel and the second subset of the first radio resource blocks comprise a second timeslot occupying the first frequency channel.

3. The method of claim 1, wherein the first subset of the first radio resource blocks comprise a first frequency channel in a first timeslot and the second subset of the first radio resource blocks comprise a second frequency channel in the first timeslot.

4. The method of claim 1, wherein the first radio resource blocks occupy a contiguous allocation in frequency and a contiguous allocation in time within a recurring timeslot.

5. The method of claim 1, wherein the first data and second data comprise payload data.

6. The method of claim 5, comprising:
in the absence of detection of the failure of a radio link, de-multiplexing a payload data stream into a first data stream for transmission via the first radio link and into a second data stream for transmission via the second radio link;
aggregating data received via the first radio link with data received via the second radio link at the second wireless station;
dependent on the failure of the first radio link being detected, transmitting the payload data stream via the second radio link; and
dependent on the failure of the second radio link being detected, transmitting the payload data stream via the first radio link.

7. The method of claim 5, wherein the first subset of the first radio resource blocks has the same capacity as the second subset of the first radio resource blocks.

8. The method of claim 1, wherein the first data comprises payload data and the second data comprises control data and does not comprise payload data.

9. The method of claim 8, comprising:
in the absence of detection of the failure of the first radio link, switching a payload data stream for transmission via the first radio link; and
dependent on the failure of the first radio link being detected, switching the payload data stream for transmission via the second radio link and
dependent on the failure of the second radio link being detected, switching the payload data stream for transmission via the first radio link.

10. The method of claim 8, wherein the first subset of radio resource blocks has greater capacity than the second subset of radio resource blocks.

11. The method of claim 10, wherein the first subset of radio resource blocks has greater than nine times the capacity of the second subset of radio resource blocks.

12. The method of claim 1, wherein the first and second subsets of radio resource blocks are radio resource blocks within a transmit timeslot of a TDD frame.

13. The method of claim 12, wherein the first and second wireless stations are part of a wireless network comprising further wireless stations synchronised according to frames of a TDD and TDMA protocol.

14. A first wireless station comprising a primary master radio and a secondary master radio, the first wireless station being configured for transmission of transmission data from the first wireless station to a second wireless station comprising a primary slave radio and a secondary slave radio, the first wireless station comprising a controller configured to:
in the absence of detection of a failure of a radio link:
de-multiplex the transmission data between first data and second data at the first wireless station;
cause the primary master radio to transmit the first data from the primary master radio to the primary slave radio via a first radio link using a first subset of first radio resource blocks and not via a second radio link from the secondary master radio to the secondary slave radio;
cause the secondary master radio to transmit the second data from the secondary master radio to the secondary slave radio via the second radio link using a second subset of the first radio resource blocks and not via the first radio link; and
aggregate the first data and the second data at the second wireless station to produce the transmission data, wherein the first subset of radio resource blocks does not include radio resource blocks from the second subset of radio resource blocks, and the second subset of radio resource blocks does not include radio resource blocks from the first subset of radio resource blocks;
monitor the first radio link and the second radio link for a fault condition comprising a failure of the first radio link or the second radio link; and
dependent on detection of the failure of the first radio link, causing the secondary master radio to use a combination of the first and second subsets of the first radio resource blocks for the second radio link to transmit the transmission data, maintaining data capacity in the fault condition, and
dependent on detection of the failure of the second radio link, causing the primary master radio to use a combination of the first and second subsets of the first radio resource blocks for the first radio link to transmit the transmission data, maintaining data capacity in the fault condition.

15. The first wireless station of claim 14, wherein the primary master radio comprises a first transmitter, the secondary master radio comprises a second transmitter, the primary slave radio comprises a first receiver, and the secondary slave radio comprises a second receiver.

16. The first wireless station of claim 14, wherein the first subset of the first radio resource blocks comprise a first timeslot occupying a first frequency channel and the second subset of the first radio resource blocks comprise a second timeslot occupying the first frequency channel.

17. The first wireless station of claim 14, wherein the first subset of the first radio resource blocks comprise a first frequency channel in a first timeslot and the second subset of the first radio resource blocks comprise a second frequency channel in the first timeslot.

18. The first wireless station of claim 14, wherein the first radio resource blocks occupy a contiguous allocation in frequency and a contiguous allocation in time within a recurring timeslot.

19. The first wireless station of claim 14, wherein the first data and second data comprise payload data.

20. The first wireless station of claim 19, comprising:
in the absence of detection of the failure of a radio link, de-multiplexing a payload data stream into a first data stream for transmission via the first radio link and into a second data stream for transmission via the second radio link;
aggregating data received via the first radio link with data received via the second radio link at the second wireless station;
dependent on the failure of the first radio link being detected, transmitting the payload data stream via the second radio link; and
dependent on the failure of the second radio link being detected, transmitting the payload data stream via the first radio link.

* * * * *